US012106071B2

(12) United States Patent
Amiel et al.

(10) Patent No.: US 12,106,071 B2
(45) Date of Patent: Oct. 1, 2024

(54) SQUARE ROOT CALCULATIONS ON AN ASSOCIATIVE PROCESSING UNIT

(71) Applicant: GSI Technology Inc., Sunnyvale, CA (US)

(72) Inventors: Eyal Amiel, Rosh HaAyin (IL); Moshe Lazer, Binyamina (IL); Samuel Lifsches, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 0 days.

(21) Appl. No.: 18/150,317

(22) Filed: Jan. 5, 2023

(65) Prior Publication Data
US 2023/0221925 A1 Jul. 13, 2023

Related U.S. Application Data

(60) Provisional application No. 63/297,753, filed on Jan. 9, 2022.

(51) Int. Cl.
*G06F 7/552* (2006.01)
(52) U.S. Cl.
CPC .................................. *G06F 7/5525* (2013.01)
(58) Field of Classification Search
CPC ...................................................... G06F 7/5525
See application file for complete search history.

(56) References Cited

U.S. PATENT DOCUMENTS

| | | | |
|---|---|---|---|
| 5,060,182 A | | 10/1991 | Briggs |
| 5,297,072 A | * | 3/1994 | Yoshida .................. G06F 7/552 |
| | | | 708/605 |
| 7,599,980 B1 | * | 10/2009 | Rarick .................. G06F 7/5525 |
| | | | 708/605 |
| 2002/0052905 A1 | | 5/2002 | Naik |
| 2003/0009501 A1 | | 1/2003 | Tang |
| 2005/0125479 A1 | | 6/2005 | Zoso |
| 2008/0288571 A1 | * | 11/2008 | Kamoshida .......... G06F 7/5525 |
| | | | 708/500 |
| 2015/0286923 A1 | | 10/2015 | Arthur |
| 2016/0313977 A1 | | 10/2016 | Dockser |

FOREIGN PATENT DOCUMENTS

GB 1013244 A 12/1965

OTHER PUBLICATIONS

International Search Report for corresponding application PCT/US23/60134 mailed on Apr. 14, 2023.

* cited by examiner

*Primary Examiner* — Emily E Larocque
(74) *Attorney, Agent, or Firm* — Heidi Brun Associates Ltd.

(57) ABSTRACT

A method for calculating a square root B having N bits of a number X having 2N bits includes iterating on bits $b_i$ of square root B starting from the most significant bit until the least significant bit of square root B. For each iteration, the method includes locating a 1 at the squared location of bit $b_i$ in a CHECK variable, determining the value of bit $b_i$ from the result of a comparison of number X with a function of all previously found bits and a previous comparison outcome, shifting all previously found bits right 1 location in a CHECK variable, and adding the determined value of bit $b_i$ into its squared location in the CHECK variable.

12 Claims, 6 Drawing Sheets

FIG. 9

SQUARE ROOT CALCULATIONS ON AN ASSOCIATIVE PROCESSING UNIT

CROSS REFERENCE TO RELATED APPLICATIONS

This application claims priority from U.S. provisional patent application 63/297,753, filed Jan. 9, 2022, which is incorporated herein by reference.

FIELD OF THE INVENTION

The present invention relates to calculations of square roots generally and to their digital calculation in particular.

BACKGROUND OF THE INVENTION

A square root of a number x, $\sqrt{x}$, is a number y such that $y^2=x$, where the number x is known as the "radicand". The number N of bits of the resultant square root y is half of the number of bits of radicand x. Thus, the square root of a 32-bit number is a 16-bit number.

For example, $\sqrt{15}$=3.8729 . . . , which, in binary is:

3.8729=0011.1101111101111011

The square root function, written as "sqrt" in most computer languages, provides the closest integer to the number (thus, sqrt(15)=3). For higher accuracy, the number may be multiplied by any even power of two ($2^{2j}$) and the result may be divided by $2^j$. Thus, in this example, 2j may be 8, so 15 may be multiplied by $2^8$=256, which provides sqrt(15*256)= sqrt(3840)=61.9677, which is about 61. In binary, 61 is 11 1101. Dividing this by $2^j=2^4$=16, produces sqrt(15)=61/ 16=11.1101.

Reference is now made to FIG. 1, which illustrates a prior art guessing and testing procedure for finding binary square roots of a variable X. The process iterates over bits of a proposed result, initialized to zero, and starts at the MSB (most significant bit) of X. Thus, in step 10, the variable CurrentResult is initially set to zero and the index n, indicating the location of the current bit being determined, is set to the number N−1, one less than the number of bits expected in the result.

In step 11, the method guesses that the value of the current bit in the square root is 1 and generates a guess using the value of the current bit along with any other bits for which a result has already been determined and stored in their locations within variable CurrentResult.

Since each bit of a binary number represents a power of 2 in a regular number (i.e., the ith bit represents $2^i$), in step 11, the method adds $2^i$ to the variable CurrentResult, which stores the previous result, to generate a variable Guess. Step 11 then computes the square value of variable Guess, according to the calculation described hereinbelow, and stores the result as a variable GuessSquared.

If the radicand X is greater than the computed square GuessSquared, as checked in step 14, the value of ith bit of variable CurrentResult is set to 1; otherwise, the value of the ith bit of variable CurrentResult is set to 0. In step 18, index i is reduced by one and the next bit is checked until no bits remain, as checked by step 19.

At each step, the square root becomes more accurate and after the last iteration (i.e., when the index i is at 0), the proposed result is the square root Y of radicand X.

Determining the square, in step 11, utilizes the fact that each new value is a sum of the result computed so far plus the value of the new bit guessed to equal 1. The square may therefore be computed using the algebraic identity:

$$(a+b)^2=a^2+2ab+b^2 \quad (1)$$

where the variable 'a' is variable CurrentResult and the variable 'b' is the value of the new bit (i.e., $2^i$).

However, $a^2$ was the value of variable GuessSquared in the last iteration and thus, the calculation per iteration is first of $2ab+b^2$ which is then added to the not-yet-updated value of variable GuessSquared to generate the current value of variable GuessSquared.

To simplify the calculations, step 14 can be calculated as "X−GuessSquared" and then the check is whether or not the result is positive or negative.

Unfortunately, even when using the value of variable GuessSquared from the last iteration, the method still has to multiply 2ab, which is more complicated with more bits.

SUMMARY OF THE PRESENT INVENTION

There is therefore provided, in accordance with a preferred embodiment of the present invention, a method for calculating a square root B having N bits of a number X having 2N bits. The method includes iterating on bits $b_i$ of square root B starting from the most significant bit until the least significant bit of square root B. For each iteration, the method includes locating a 1 at the squared location of bit $b_i$ in a CHECK variable, determining the value of bit $b_i$ from the result of a comparison of number X with a function of all previously found bits and a previous comparison outcome, shifting all previously found bits right 1 location in a CHECK variable, and adding the determined value of bit $b_i$ into its squared location in the CHECK variable.

Moreover, in accordance with a preferred embodiment of the present invention, the CHECK variable is of length 2N and, the determining uses only the relevant portion of the CHECK variable.

Further, in accordance with a preferred embodiment of the present invention, in the locating, the squared location is two bits to the right of the current locations of all previously found bits in the CHECK variable.

Still further, in accordance with a preferred embodiment of the present invention, the adding is implemented as an OR operation.

Moreover, in accordance with a preferred embodiment of the present invention, the method is implemented on an associative memory device or on a CPU.

There is also provided, in accordance with a preferred embodiment of the present invention, a square root calculator for calculating a square root B having N bits of a number X having 2N bits. The calculator includes a central processing unit (CPU) and a memory array having a plurality of memory cells organized into rows and columns. The memory array has one row for a CHECK variable and a second row for a PREV variable, the PREV variable being aligned with the CHECK variable. The CPU iterates on bits $b_i$ of square root B starting from the most significant bit until the least significant bit of square root B. For each iteration, the CPU locates a 1 at the squared location of bit $b_i$ in the CHECK variable, determines the value of bit $b_i$ from the result of a comparison of number X with a function of all previously found bits and a previous comparison outcome, shifts all previously found bits right 1 location in the CHECK variable, and adds the determined value of bit $b_i$ into its squared location in the CHECK variable.

Further, in accordance with a preferred embodiment of the present invention, the CHECK variable is of length 2N and the CPU uses only the relevant portion of the CHECK variable.

Still further, in accordance with a preferred embodiment of the present invention, the squared location is two bits to the right of the current locations of all previously found bits in the CHECK variable.

There is also provided, in accordance with a preferred embodiment of the present invention, a square root calculator for calculating a square root B having N bits of a number X having 2N bits. The calculator includes an associative processing unit (APU) and the APU includes a memory array, a multiple row decoder and a controller. The memory array has a plurality of memory cells organized into rows and columns, where one row stores a CHECK variable and a second row stores a PREV variable, the PREV variable being aligned with the CHECK variable. The multiple row decoder activates multiple rows at a time and the controller activates the multiple row decoder to iterate on bits $b_i$ of square root B starting from the most significant bit until the least significant bit of square root B. For each iteration, the controller instructs the following operations: writing a 1 at the squared location of bit $b_i$ in the CHECK variable, determining the value of bit $b_i$ from the result of a comparison of number X with a function of all previously found bits and a previous comparison outcome, shifting all previously found bits right 1 location in the CHECK variable, and OR'ing the determined value of bit $b_i$ in its squared location with the CHECK variable.

Further, in accordance with a preferred embodiment of the present invention, the CHECK variable is of length 2N and, wherein the OR'ing uses only the relevant portion of the CHECK variable.

Finally, in accordance with a preferred embodiment of the present invention, the squared location is two bits to the right of the current locations of all previously found bits in the CHECK variable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is a tabular illustration of the values of the bits of a variable CHECK at the end of iterations 15-0.

Figure 1:
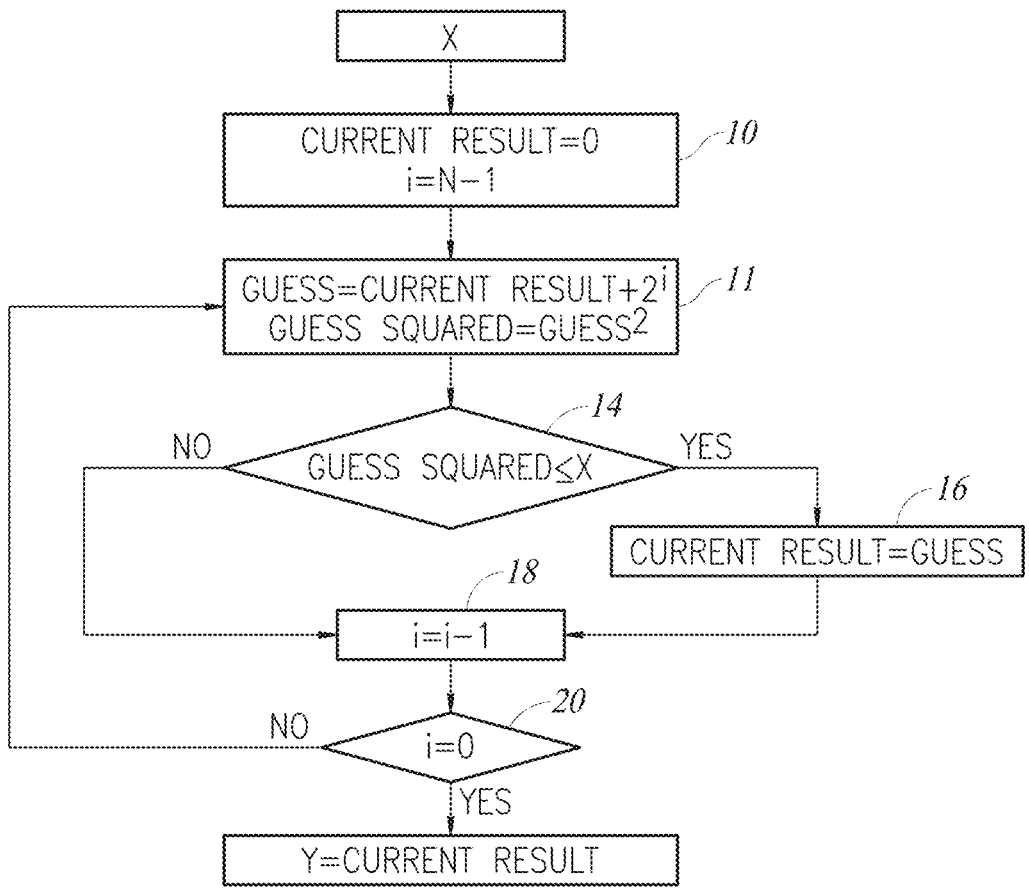
FIG. 1 is a flow chart illustration of a prior art guessing and testing procedure for finding binary square roots of a variable X.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that there is no need to consider the value of the entire guessed value, as the prior art does. Instead, Applicant has realized that very few powers of 2 are involved in the initial iterations and that this fact can be exploited to simplify the calculations to bit operations, such as shift and OR. As a result, the complexity of the square root computation for an N-bit result is reduced from $O(N^2)$ to $O(N)$.

Applicant has also realized that the result of the current test calculation can be used in the next iteration when the resultant value of the current bit is 1 while the result of the previous current test calculation can be used when the resultant value of the current bit is 0.

Take for example, a 32-bit number X whose square root value B is a 16-bit number. Square root B can be represented in the following manner:

$$b_{15}b_{14}b_{13}b_{12}b_{11}b_{10}b_{09}b_{08}b_{07}b_{06}b_{05}b_{04}b_{03}b_{02}b_{01}b_{00}$$

This can be written mathematically as:

$$B=\Sigma_0^{15} b_i 2^i \qquad (2)$$

where the bit $b_i$ is 0 or 1.

Figure 2:
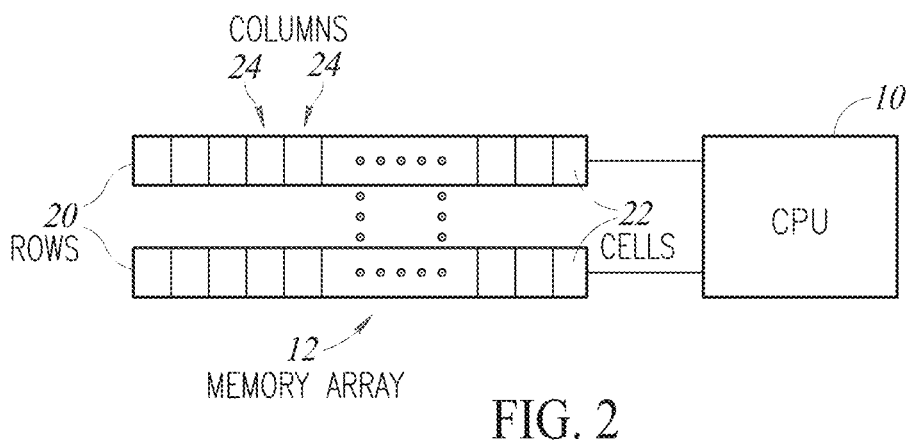
FIG. 2 is a schematic illustration of a square root calculator to find square root B of variable X, constructed and operative in accordance with a preferred embodiment of the present invention.

Reference is now made to FIG. 2, which illustrates a square root calculator comprising a central processing unit (CPU) 10 and a memory array 12. Memory array 12 may comprise a multiplicity of rows 20, two of which are shown in FIG. 2. Each row 20 has a plurality of memory cells 22 within which one bit of data is stored. Memory cells 22 are also organized in columns 24 such that each memory cell 22 can be accessed by activating its row 20 and its column 24.

A 32-bit number (also called a "vector") is stored in 32 separate memory cells 22 of one of rows 20. While the memory cells 22 may not be adjacent, typically, a 32-bit number is stored in order, with the most significant bit (MSB) stored in the leftmost location of the set of memory cells 22 and the least significant bit (LSB) stored in the rightmost location. Since bit locations are numbered from 0 to 31, the MSB is stored in bit location 31 and the LSB is stored in bit location 0.

Figure 3:
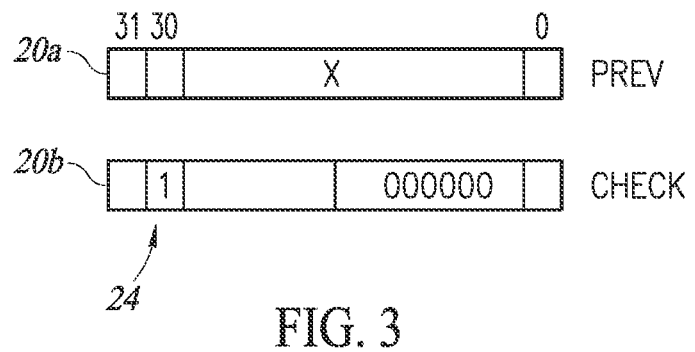
FIGS. 3, 4, 5 and 6 are schematic illustrations showing the operation of the calculator of FIG. 2 when determining the $15^{th}$ bit $b_{15}$, the $14^{th}$ bit $b_{14}$, the $13^{th}$ bit $b_{13}$, and an $i^{th}$ bit $b_i$ of square root B, respectively.

FIG. 3, to which reference is now made, shows the operation of the present invention when determining the $15^{th}$ bit $b_{15}$ of square root B. FIG. 3 shows two variables PREV and CHECK stored in two rows 20a and 20b, respectively. In this example, variables PREV and CHECK may be stored in rows 20 with their bit locations aligned. Thus, bit location 30 of variable PREV is in the same column 24 as bit location 30 of variable CHECK.

For the 15$^{th}$ bit $b_{15}$, variable PREV may store 32-bit number X whose square root is to be found and variable CHECK may initially be set to all 0's.

To find the value of the 15th bit $b_{15}$, the check is simply to determine if the difference between the 32-bit number X and the square of 15$^{th}$ bit $b_{15}$ is positive when $b_{15}$ is set temporarily to 1. Mathematically this is written as:

$$X-(b_{15}2^{15})^2 >= 0 \text{ when } b_{15} \text{ is } 1 \qquad (3)$$

However, in accordance with the present invention, since $b_{15}$ has been set to 1 and the square of $2^{15}$ is $2^{30}$, equation 3 can be rewritten as:

$$X-[(1*2^{30})] >= 0 \qquad (4)$$

In accordance with a preferred embodiment of the present invention, to subtract $1*2^{30}$ from X, CPU 10 may write a 1 in bit location 30 (which is the "squared location" of bit 15) of row 20b storing variable CHECK.

CPU 10 may then subtract the variable CHECK from the variable PREV to generate a TEST variable:

$$\text{TEST=PREV-CHECK} \qquad (5)$$

CPU 10 may then check if TEST is positive. If so, it may set $b_{15}$ to 1 and, in accordance with the present invention, may set bit 30 of CHECK to 1 (leaving the remaining bits at their initialized values of 0) and may update variable PREV in row 20a to the value of variable TEST.

Otherwise, CPU 10 may set $b_{15}$ to 0, may change bit 30 of variable CHECK back to 0, and may make no change to variable PREV since there was no change to bit 30.

CPU 10 may now operate to determine the value of the 14$^{th}$ bit, $b_{14}$. To do so, it has to check if the difference between the 32-bit number X and the square of the sum of the 15$^{th}$ bit $b_{15}$ (found previously) with the 14$^{th}$ bit $b_{14}$ is positive when $b_{14}$ is set temporarily to 1. Mathematically, this is written as:

$$X-(b_{15}2^{15}+b_{14}2^{14})^2 >= 0 \qquad (6)$$

Using the identity $(a+b)(a+b)=a^2+2ab+b^2$ and setting 14$^{th}$ bit $b_{14}$ temporarily to 1, we get:

$$X-(b_{15}2^{15})^2-[2(b_{15}2^{15})*(1*2^{14})+(1*2^{14})^2] >= 0 \qquad (7)$$

Recall that the square of $2^{15}$ is $2^{30}$ and that variable PREV stores the variable TEST from the previous iteration which equaled $X-b_{15}2^{30}$. Similarly, the square of $2^{14}$ is $2^{28}$. Also note that the 2ab term, $2(b_{15}2^{15})*(1*2^{14})$, is equivalent to $(b_{15}2^{15})*(1*2^{15})$. Thus, equation 7 may be rewritten as:

$$\text{PREV}-[(b_{15}2^{15})*(1*2^{15})+(1*2^{28})] >= 0 \qquad (8)$$

Which, when consolidated, becomes:

$$\text{PREV}-[(b_{15}2^{30}+(1*2^{28})] >= 0 \qquad (9)$$

Figure 4:
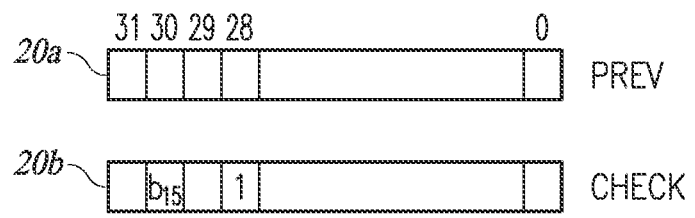

In accordance with a preferred embodiment of the present invention, to implement equation 6, CPU 10 may write a 1 in bit location 28 (which is the squared location of bit 14) of row 20b storing variable CHECK. Note that, as shown in FIG. 4 to which reference is now made, CHECK already has the value of $b_{15}$ in location 30 from the previous iteration.

The next steps may be similar to the previous iteration. CPU 10 may implement equation 5 (i.e., subtract variable CHECK from variable PREV to generate variable TEST). CPU 10 may then check if variable TEST is positive. If so, it may set $b_{14}$ to 1 and may update variable PREV in row 20a to the value of variable TEST. Otherwise, CPU 10 may set bit $b_{14}$ to 0, and may make no change to variable PREV since there was no change to bit 28.

Figure 5:
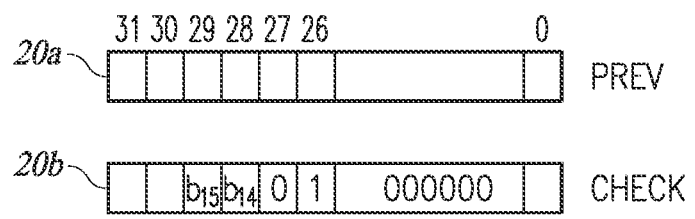

In accordance with a preferred embodiment of the present invention and in preparation for the next iteration described in more detail hereinbelow, in order to update variable CHECK, CPU 10 may first set location 28 back to 0, may shift variable CHECK right one bit, which may move bit $b_{15}$ to location 29 (as shown in FIG. 5 to which reference is now made), after which CPU 10 may add the determined value for bit $b_{14}$ to location 28 (also shown in FIG. 5).

CPU 10 may now operate to determine the value of the 13$^{th}$ bit, $b_{13}$. To do so, it has to check if the difference between the 32-bit number X and the square of the sum of the 15$^{th}$ bit $b_{15}$, the 14$^{th}$ bit $b_{14}$, and the 13$^{th}$ bit $b_{13}$, is positive when $b_{13}$ is set temporarily to 1. Mathematically, this is written as:

$$X-(b_{15}2^{15}+b_{14}2^{14}\pm b_{13}2^{13})^2 >= 0 \qquad (10)$$

Equation 10 is more complex; however, Applicant has realized that variables PREV and CHECK from the previous iteration store useful information.

Using the identity $(a+b)(a+b)=a^2+2ab+b^2$, defining 'a' as the previous result (i.e., $b_{15}2^{15} b_{14}2^{14}$), and setting 13$^{th}$ bit $b_{13}$ temporarily to 1, we get:

$$X-[(b_{15}2^{15}+b_{14}2^{14})^2]-[2(b_{15}2^{15}+b_{14}2^{14})*(1*2^{13})+(1*2^{13})^2] >= 0 \qquad (11)$$

Recall that that variable PREV stores the variable TEST from the previous iteration which equaled $X-(b_{15}2^{15}+b_{14}2^{14})^2$, and that the square of $2^{13}$ is $2^{26}$. Also note that the 2ab term, $2(b_{15}2^{15}+b_{14}2^{14})*(1*2^{13})$, is equivalent to $(b_{15}2^{15}+b_{14}2^{14})*(1*2^{14})$. Thus, equation 11 may be rewritten as:

$$\text{PREV}-[(b_{15}2^{29}+b_{14}2^{28})+(1*2^{26})] >= 0 \qquad (12)$$

The second term in Equation 12 will become the updated version of variable CHECK. However, note that its bit locations are as follows: $b_{15}$ in bit location 29 (to where it was shifted in the last iteration, in preparation for equation 12), $b_{14}$ in bit location 28 (where it was placed at the end of the last iteration) and a 1 temporarily in bit location 26 (i.e. the squared location of $b_{13}$). Applicant has realized that this is the value of variable CHECK after the previous iteration, OR'd with a 1 in bit 13's squared location.

The next steps may be similar to the previous iteration. CPU 10 may implement equation 5 (i.e., subtract variable CHECK from variable PREV to generate variable TEST).

CPU 10 may then check if variable TEST is positive. If so, it may set bit $b_{13}$ to 1 and may update variable PREV in row 20a to the value of variable TEST. Otherwise, CPU 10 may set bit $b_{13}$ to 0, and may make no change to variable PREV since there was no change to bit 26.

As in the previous iteration, in order to update variable CHECK, CPU 10 may first set location 26 back to 0, may shift variable CHECK right one bit, which may move bit $b_{15}$ to location 28 and bit $b_{14}$ to location 27, after which CPU 10 may add the determined value for bit $b_{13}$ to location 26.

Figure 6:
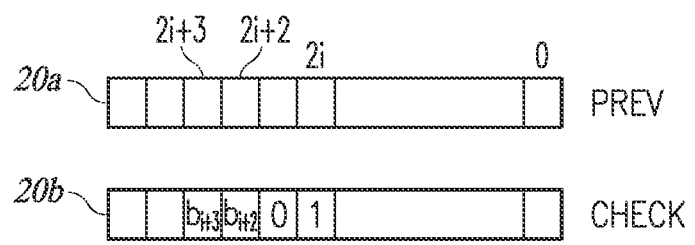

It will be appreciated that, each iteration i to determine bit b has to calculate the following:

$$\text{PREV}-[(\ldots b_{i+2}2^{2i+3}+b_{i+1}2^{2i+2})+(1*2^{2i})] >= 0 \qquad (13)$$

where variable PREV exists from the previous iteration and the second term in Equation 13 is built from the previous version of variable CHECK. As shown in FIG. 6 to which reference is now briefly made, the bit locations are as follows: a 1 temporarily in bit location 2i (i.e., the squared location of bit $b_i$), and the previously solved bits in order to its left, starting at bit location i+2 (i.e., two locations to its left).

In other words, the updated version of variable CHECK is the final version of variable CHECK from the previous iteration OR'd with a 1 in the squared location of bit $b_i$.

Figure 7:
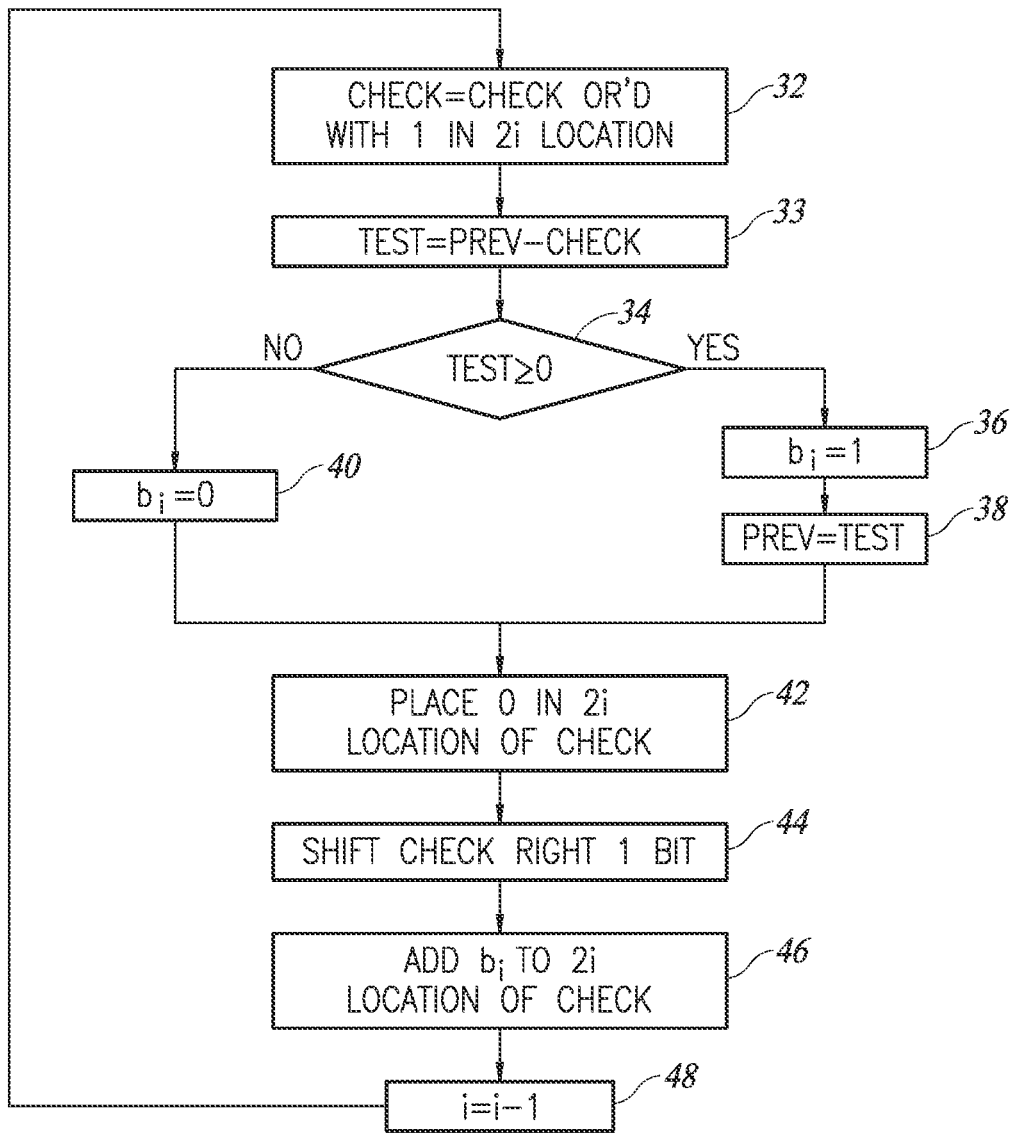
FIG. 7 is a flow chart illustration of a method for most iterations as illustrated in FIG. 6.

The method for most iterations is shown in FIG. 7 to which reference is now made. In step 32, CPU 10 may OR variable CHECK from the previous iteration with a 1 in its 2i location (i.e., the squared location of bit $b_i$). CPU 10 may then subtract (step 33) variable CHECK from variable PREV to generate variable TEST. CPU 10 may then check (step 34) if variable TEST is positive. If so, it may set (step 36) bit b to 1 and may update (step 38) variable PREV in row 20a to the value of variable TEST. Otherwise, CPU 10 may set (step 40) bit $b_i$ to 0, and may make no change to variable PREV since there was no change to bit $b_i$. To update variable CHECK, CPU 10 may first set (step 42) location 2i back to 0, may shift (step 44) variable CHECK right one bit, and then may add (step 46) the determined value for bit $b_i$ to location 2i of variable CHECK. Note that step 46 is only necessary if bit $b_i$ is 1, since location 2i was previously set back to 0. In step 48, index i is reduced by 1 and the process is repeated until index i is 0. For the $0^{th}$ iteration, the squared location for bit $b_0$ is the $0^{th}$ bit location.

It will be appreciated that, when the process finishes, variable CHECK has shifted totally to the right and the 16 bits b of square root B have been determined.

It will be appreciated that, as mentioned hereinabove, the addition operation can be replaced with an OR operation since the operands PREV and CHECK are disjoint since there are 2 bits between $b_i$ in its squared location ($2^{2i}$), and the previously solved bits (from $2^{2i+2}$ on). In other words, the new bits in each iteration do not overlap old bits from previous iterations and therefore, there will never be a carry value.

It will further be appreciated that the OR operation reduces the complexity of each subtraction operation from O(N) to O(1).

Figure 8:
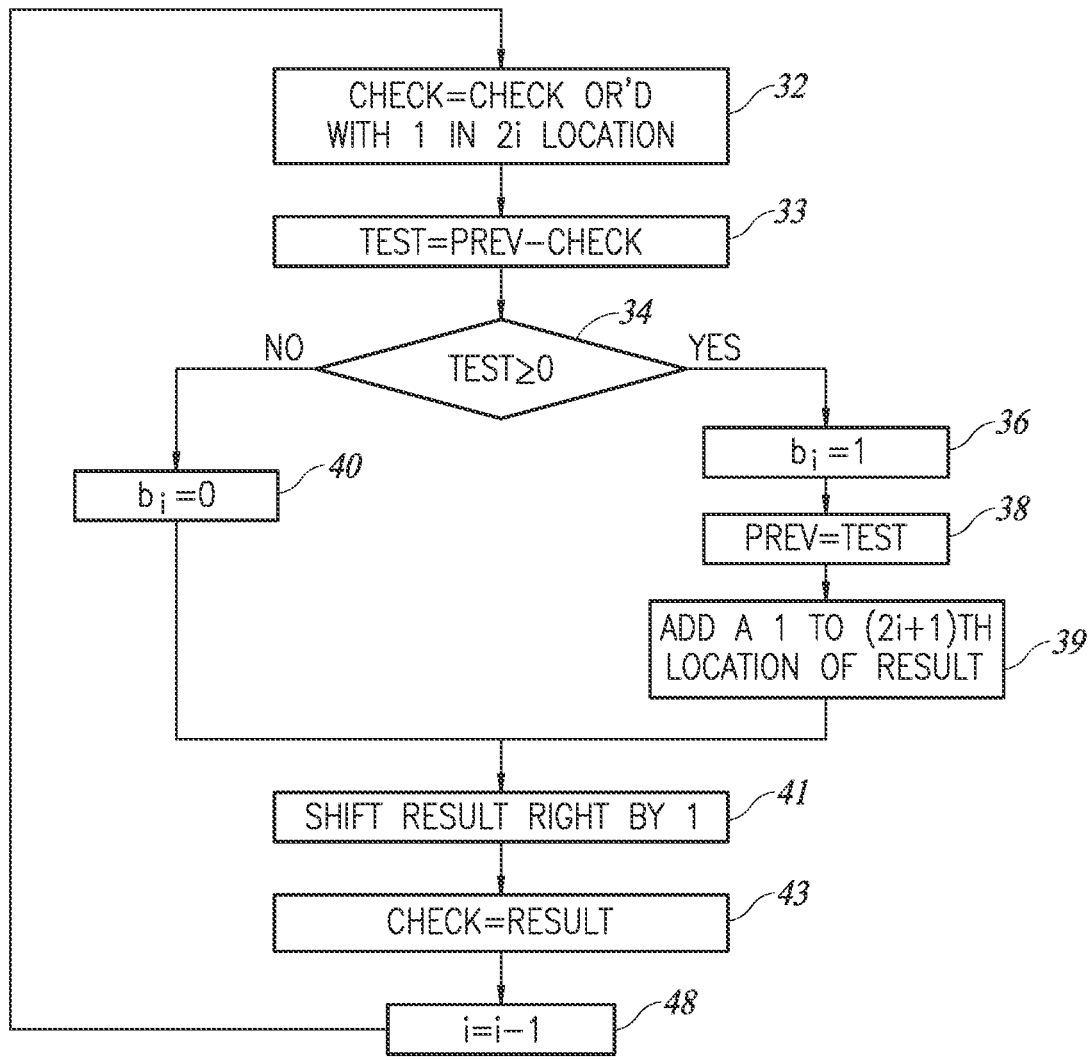
FIG. 8 is a flow chart illustration of an alternative method for calculating square roots.

Reference is now made to FIG. 8, which shows an alternative embodiment of the present invention which uses a variable RESULT to store the bits as they are being determined, but as shifted squared locations of each bit $b_i$. Thus, at the beginning of the ith iteration, variable RESULT will have the (i+1)th bit in the 2i+2 location, the (i+2)th bit in the 2i+3 location, and so on.

In this embodiment, step 38 is followed by step 39, where CPU 10 adds a 1 to the (2i+1)th location since variable TEST is positive. Then CPU 10 shifts (step 41) variable RESULT right by 1 bit location. In step 43, CPU 10 updates variable CHECK to the value of variable RESULT. In this manner, at the end of the iterations, variable RESULT will be shifted from its wide state holding the number of bits in variable X (32 bits in the example above) to its square root state (16 bits in this example) and, in the square root state it will store the results (i.e., square root B).

Figure 9:
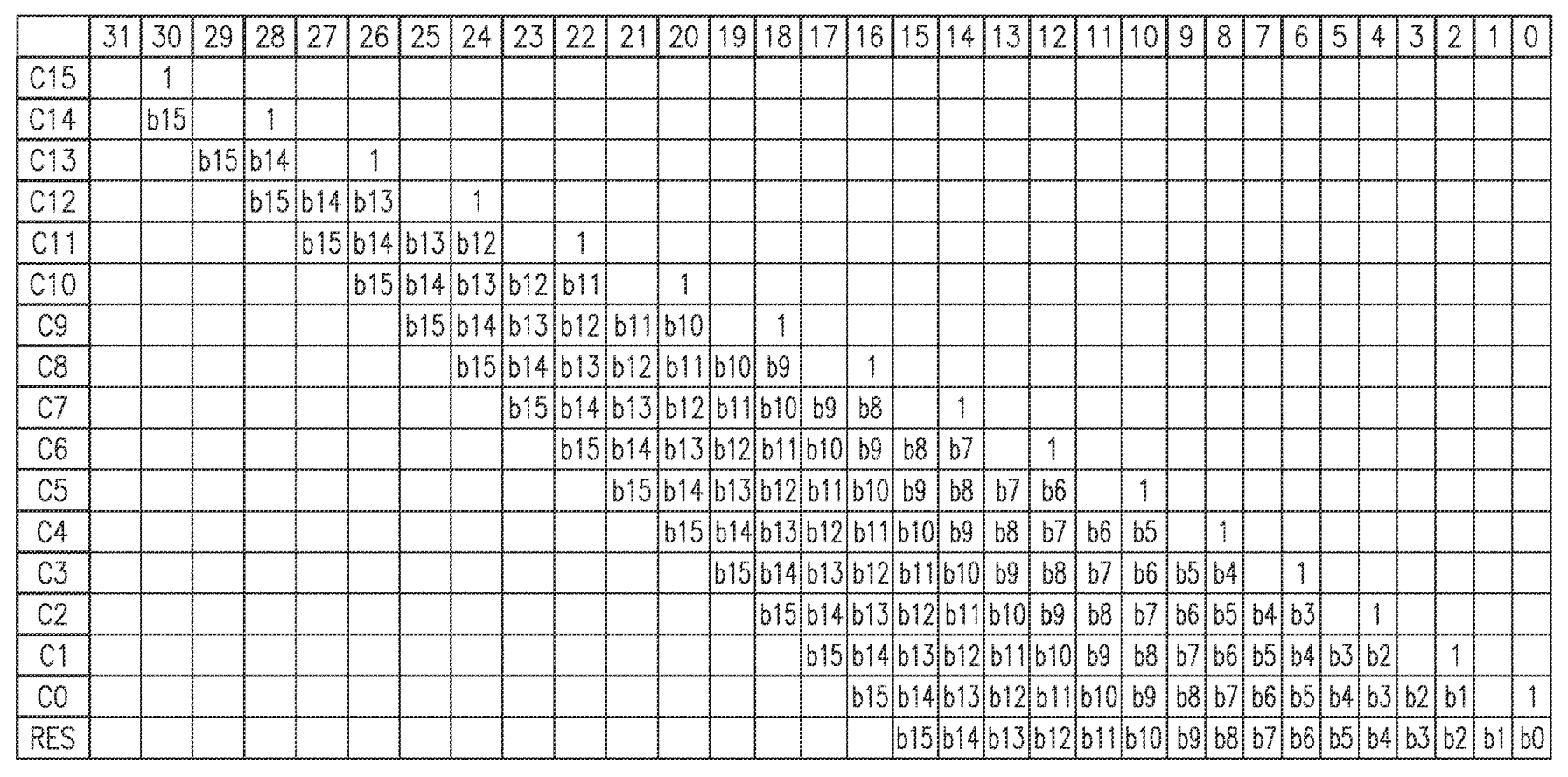

Reference is now made to FIG. 9, which shows a table of the values of the bits of variable CHECK at the end of iterations 15-0. The columns hold the bits, listed from bit 31 to bit 0, and the rows store the variable CHECKi, listed as Ci, from C15 to C0. To begin with (i.e., at C15 when i=15), variable CHECK stores the check value of 1 in the $30^{th}$ bit location. In the next iteration (at C14), variable CHECK stores bit value $b_{15}$ in the $29^{th}$ location and the check value of 1 in the $28^{th}$ bit location. After the final iteration and the final shift right, variable CHECK contains the final result value, listed in a RESULT (i.e., RES) row.

Applicant has noted that, for the first 8 iterations (i.e., C15-C8), there is no data in the lower part of variable CHECK (i.e., in bits 15-0). Therefore, the lower bits do not have to be included in the subtraction operation until C7.

Similarly, for the final 8 iterations, there is no data in the upper part of variable CHECK (i.e., in bits 24-31), due to the shifting. Therefore, the higher 8 bits do not have to be included in the subtraction operation after C7. Instead, at this point, CPU 10 may include the lower bits (i.e., bits 0-15) and the middle bits (16-23) in the subtraction operation.

However, it is typically very difficult for a CPU, such as CPU 10, to perform bit-wise operations and thus, CPU 10 cannot easily include only the upper or only the middle and lower bits in a subtraction operation. Moreover, it is especially difficult for a CPU to do so on a plurality of values at one time.

Applicant has realized that the proposed method and system is particularly efficient when performed on an associative processing unit (APU), such as the Gemini, commercially available from GSI Technology Inc. As described in U.S. Pat. No. 8,238,173, entitled "Using Storage Cells to Perform Computation", U.S. Pat. No. 9,418,719 entitled "In-Memory Computational Device", and U.S. Pat. No. 9,558,812, entitled "SRAM Multi-Cell Operations", all assigned to the common assignee of the present invention and incorporated herein by reference, the APU operates separately on each bit and thus, can easily operate on only some of the bits, such as only on the upper bits or only on the middle and lower bits of the variables PREV and CHECK. Furthermore, the APU operates on 32K values in parallel, and can thus perform addition and subtraction on selected bits of multiple numbers at the same time.

Figure 10:
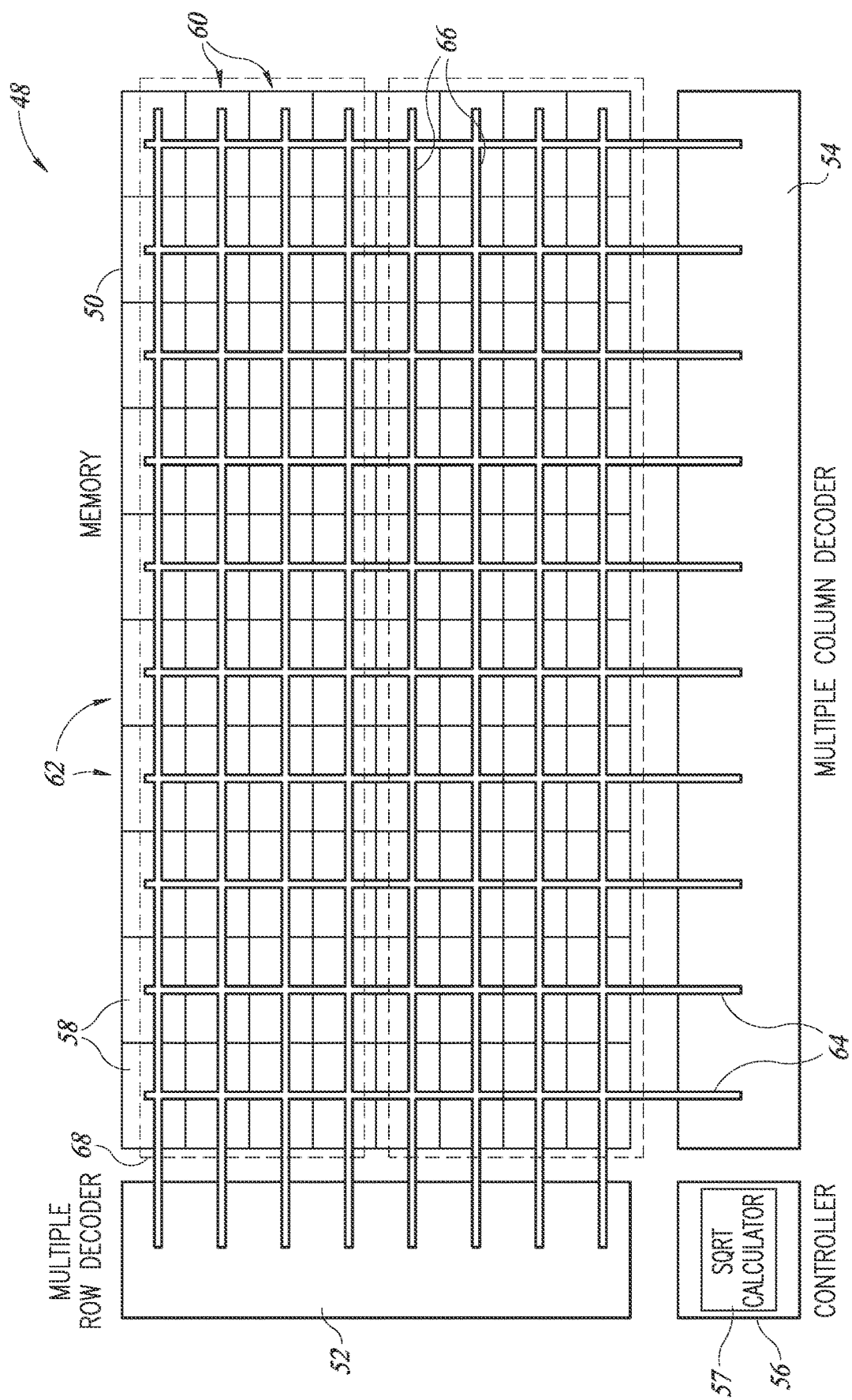
FIG. 10 is a schematic illustration of a portion of an associative processing unit for implementing a square root calculator, constructed and operative in accordance with a preferred embodiment of the present invention.

Reference is now briefly made to FIG. 10, which illustrates an exemplary portion of an APU 48 which comprises an associative memory array 50, a multiple row decoder 52, a multiple column decoder 54 and a controller 56. Associative memory array 50 may be divided into a multiplicity of sections 68, of which FIG. 10 shows only 2 exemplary sections 68. Each section 68 has a plurality of cells 58 arranged in rows 60 and columns 62. The cells 58 in a row 60 are connected by a word line 66 capable of activating cells in multiple columns 62.

A number to be operated upon is stored in one column 62 and there are typically 32K columns 62 storing 32K numbers. The cells 58 in a column 62 are connected by a bit line processor 64, connected to multiple column decoder 54, capable of enabling computation on its column 62. Each column 62 is divided into multiple sections 68 and typically, each section operates on a single bit of a multi-bit number stored in the column.

Unique to APUs, multiple row decoder 52 may activate multiple rows 60 concurrently and multiple column decoder 54 may activate multiple columns 62 concurrently, in each section 68. Decoders 52 and 54 are controlled by controller 56 to implement desired methods and algorithms. Each column 62 of each section 68 may perform the needed computation for a single bit and activating multiple columns of the same section 68 results in concurrent computation of the same bit but of multiple numbers.

Since each section 68 is separately operatable, APU 48 operates separately on each bit and thus, can select which sections of variables PREV and CHECK to operate at any time.

It will be appreciated that the method and system described hereinabove can be implemented on numbers, or vectors, with more than the standard 32 bits. Since most working spaces are divided into 16-bit partitions, then a calculation on a 48-bit vector may have three partitions—a high partition, a middle partition and a lower partition. At the beginning, controller 56 implements operations only on the high partition. After 16 bits, controller 56 adds the middle partition until the method no longer works on any bits in the high partition. At this point, controller 56 adds the lower partition. Thus, for a number that contains more than 32 bits, there is a point where the subtraction no longer operates on the high partition.

It will be appreciated that the present invention provides an efficient method for computing the square root of a number. Moreover, when implemented on an associative memory device, it may concurrently and efficiently compute the square root of multiple numbers.

Applicant has also realized that building the square root from the left side (using the square value of a guess) and shifting the result right in each iteration (to get the square value of the current guess) reduces the complexity of the square root computation for N-bit number X from $O(N^2)$ to $O(N)$. In addition, since the operands are disjoint, APU 48 implements the addition operation with an OR operation, which is a single cycle operation on APU 48, as opposed to the addition operation which takes 12 cycles for 32K elements. This reduces the complexity of each addition from $O(N)$ to $O(1)$.

It will also be appreciated that, in APU 48, the update operation (i.e., steps 42, 44 and 46 of FIG. 7) can be performed in one cycle. For the 13$^{th}$ bit of the example, this may involve shifting right bits $b_{15}$, $b_{14}$ from locations 29 and 28 to locations 28 and 27 by writing bit $b_{15}$ to location 28, bit $b_{14}$ to location 27 and a 0 to location 29 and, at the same time, if the result is false (i.e. $b_{13}$ is 0), write a 0 to location 26.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for calculating a square root B having N bits of a number X having 2N bits, the method comprising:
   iterating on bits $b_i$ of said square root B starting from the most significant bit until the least significant bit of square root B and for each iteration i, performing the following;
   locating a 1 at a squared location of the ith bit in a CHECK variable stored in a row of a memory array, said CHECK variable storing previously determined bits;
   determining a value of bit $b_i$ from a result of a difference between a remainder from a previous difference and said CHECK variable;
   in said row, shifting all previously determined bits right 1 location in said CHECK variable; and
   adding the determined value of bit $b_i$ into its squared location in said CHECK variable.

2. The method according to claim 1 wherein said CHECK variable is of length 2N and, wherein said determining a value of bit $b_i$ uses only a relevant portion of said CHECK variable.

3. The method according to claim 1 wherein, in said locating, said squared location is two bits to the right of the current locations of all previously determined bits in said CHECK variable.

4. The method according to claim 1 wherein said adding is implemented as an OR operation.

5. The method according to claim 1 which is implemented on an associative memory device.

6. The method according to claim 1 which is implemented on a central processing unit (CPU).

7. A square root calculator for calculating a square root B having N bits of a number X having 2N bits, the calculator comprising:
   a central processing unit (CPU) and;
   a memory array having a plurality of memory cells organized into rows and columns, the memory array having one row for a CHECK variable and a second row for a PREV variable, said PREV variable being aligned with said CHECK variable;
   said CPU to iterate on bits $b_i$ of said square root B starting from the most significant bit until the least significant bit of square root B and, for each iteration, said CPU to:
   locate a 1 at a squared location the ith bit in said row of said CHECK variable, said CHECK variable storing previously determined bits;
   determine a value of bit $b_i$ from a result of a difference between said PREV variable, storing a remainder from a previous difference, and said CHECK variable;
   shift all previously determined bits right 1 location in said row of said CHECK variable; and
   add the determined value of bit $b_i$ into its squared location in said CHECK variable.

8. The calculator according to claim 7 wherein said CHECK variable is of length 2N and, wherein said CPU uses only a relevant portion of said CHECK variable.

9. The calculator according to claim 7 wherein said squared location is two bits to the right of the current locations of all previously determined bits in said CHECK variable.

10. A square root calculator for calculating a square root B having N bits of a number X having 2N bits, the calculator comprising:
    an associative processing unit (APU), said APU comprising:
    a memory array having a plurality of memory cells organized into rows and columns, the memory array having one row for a CHECK variable and a second row for a PREV variable, said PREV variable being aligned with said CHECK variable;
    a multiple row decoder to activate multiple rows at a time; and
    a controller to activate said multiple row decoder to iterate on bits $b_i$ of said square root B starting from the most significant bit until the least significant bit of square root B and, for each iteration, said controller to instruct the following operations:
    writing a 1 at a squared location of the ith bit in said CHECK variable, said CHECK variable storing previously determined bits;
    determining a value of bit $b_i$ from a result of a difference between said PREV variable, storing a remainder from a previous difference, and said CHECK variable;
    shifting all previously determined bits right 1 location in said CHECK variable; and
    OR'ing the determined value of bit $b_i$ in its squared location with said CHECK variable.

11. The calculator according to claim 10 wherein said CHECK variable is of length 2N and, wherein said OR'ing uses only a relevant portion of said CHECK variable.

12. The calculator according to claim 10 wherein said squared location is two bits to the right of the current locations of all previously determined bits in said CHECK variable.

* * * * *